United States Patent
Yang

(10) Patent No.: US 9,228,694 B2
(45) Date of Patent: Jan. 5, 2016

(54) SERVO ROTARY CARRIER

(71) Applicant: To King Technology Co., Ltd., Bade, Taoyuan County (TW)

(72) Inventor: Li-Yuan Yang, Bade (TW)

(73) Assignee: To King Technology Co., Ltd., Bade, Taoyuan County (TW)

( * ) Notice: Subject to any disclaimer, the term of this patent is extended or adjusted under 35 U.S.C. 154(b) by 0 days.

(21) Appl. No.: 14/289,652

(22) Filed: May 29, 2014

(65) Prior Publication Data

US 2015/0345693 A1 Dec. 3, 2015

(51) Int. Cl.
*A47B 85/00* (2006.01)
*F16M 11/18* (2006.01)
*F16H 35/18* (2006.01)

(52) U.S. Cl.
CPC .............. *F16M 11/18* (2013.01); *F16H 35/18* (2013.01)

(58) Field of Classification Search
CPC ............. A47F 5/025; A47F 5/03; A47F 3/11; A47B 11/00; F16M 11/08; F16M 2200/021
USPC ............ 108/20, 21, 22, 94, 55.3, 55.1; 74/16; 248/349.1
See application file for complete search history.

(56) References Cited

U.S. PATENT DOCUMENTS

| | | | | |
|---|---|---|---|---|
| 1,435,856 A * | 11/1922 | Kelly | ............................... | 108/20 |
| 1,490,608 A * | 4/1924 | Gilmour | .................. | 248/346.03 |
| 1,676,108 A * | 7/1928 | Novak | .............................. | 108/20 |
| 1,789,562 A * | 1/1931 | Penniman et al. | .............. | 108/20 |
| 1,982,776 A * | 12/1934 | Woerner | ......................... | 108/20 |
| 2,902,741 A * | 9/1959 | Hankin, Jr. | ...................... | 108/22 |
| 3,155,383 A * | 11/1964 | Whitmore | ....................... | 269/58 |
| 3,448,701 A * | 6/1969 | Cordova | ......................... | 108/20 |
| 3,754,759 A * | 8/1973 | Breslow et al. | ............... | 273/440 |
| 4,504,715 A * | 3/1985 | Jorgensen et al. | ............. | 108/20 |
| 4,555,990 A * | 12/1985 | Egawa | ............................ | 108/20 |
| 5,079,789 A * | 1/1992 | Jandrakovic | ............... | 248/349.1 |
| 5,239,892 A * | 8/1993 | Sakai | .............................. | 108/20 |
| 5,297,485 A * | 3/1994 | Bond | .......................... | 108/55.1 |
| 5,553,865 A * | 9/1996 | Shoemaker et al. | ............ | 108/20 |
| 5,593,609 A * | 1/1997 | Fletcher | ......................... | 108/20 |
| 6,107,615 A * | 8/2000 | Choi | ............................. | 108/20 |
| 6,112,783 A * | 9/2000 | Newman | .................. | 144/144.52 |
| 6,811,131 B2 * | 11/2004 | Kuo | .......................... | 248/346.03 |
| 2007/0283853 A1 * | 12/2007 | Sun | ................................. | 108/20 |
| 2010/0001162 A1 * | 1/2010 | Sato et al. | .................. | 248/349.1 |

* cited by examiner

*Primary Examiner* — Jose V Chen
(74) *Attorney, Agent, or Firm* — Leong C. Lei

(57) ABSTRACT

A servo rotary carrier includes a base, which includes a receiving space formed therein and has a top in which first and second openings that communicate with and between the receiving space and the outside are formed; a rotation unit, which includes a supporting section extending through the first opening of the base and a bearing coupled to the supporting section and having a top to which a first toothed wheel is mounted; a disk, which has a top to which clamping elements are mounted, the first toothed wheel being coupled to a bottom of the disk; and a power transmission unit, which includes a power source and a transmission device coupled to the power source and having a transmission spindle that extends vertically upward through the second opening and includes a second toothed wheel coupled thereto to mate the first toothed wheel.

3 Claims, 4 Drawing Sheets

SERVO ROTARY CARRIER

TECHNICAL FIELD OF THE INVENTION

The present invention generally relates to a measurement carrying platform, and more particularly to a servo rotary carrier for rotation measurement.

DESCRIPTION OF THE PRIOR ART

A conventional measurement rotary carrying device generally comprises a base, a power source arranged inside the base, and a carrying platform. The power source is coupled to the carrying platform. The carrying platform function to receive an object-to-be-inspected to be placed thereon.

When the power source is activated, the rotation of a transmission spindle of the power source drives the carrying platform to rotate. However, the carrying platform is only supported by the power source and thus, it is susceptible for the carrying platform to incline during the rotation thereof, making it incapable of supporting the weights of the carrying platform and the object-to-be-inspected and thus losing accuracy of measurement. Further, due to the excessive loading, the motor may get broken. These are the common disadvantages of the conventional devices and the present invention aims to overcome such problems.

In view of these, the present invention aims to provide a solution to overcome such problems.

SUMMARY OF THE INVENTION

In view of the above drawbacks, the present invention provides a servo rotary carrier, which comprises: a base, which comprises a receiving space formed therein, the base having a top in which a first opening that communicates with and between the receiving space and the outside and a second opening that communicates with and between the receiving space and the outside are formed, the first opening being formed in a center of the base, the second opening being formed at a predetermined location in the base; a rotation unit, which comprises a supporting section and a bearing coupled to the supporting section, the supporting section extending through the first opening of the base, the bearing having a top to which a first toothed wheel is mounted; a disk, which is arranged in such a way that the disk has a top to which a plurality of clamping elements is mounted, the first toothed wheel being coupled to a bottom of the disk; and a power transmission unit, which comprises a power source and a transmission device coupled to the power source, the transmission device having a transmission spindle that extends vertically upward through the second opening, the transmission spindle comprising a second toothed wheel coupled thereto to mate the first toothed wheel.

The primary object of the servo rotary carrier according to the present invention is that the rotation unit is used as a support point for supporting the disk so as to reduce the loading of the power transmission unit, whereby the disk, when carrying an object, does not cause a situation of getting inclined and has an extended life span.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
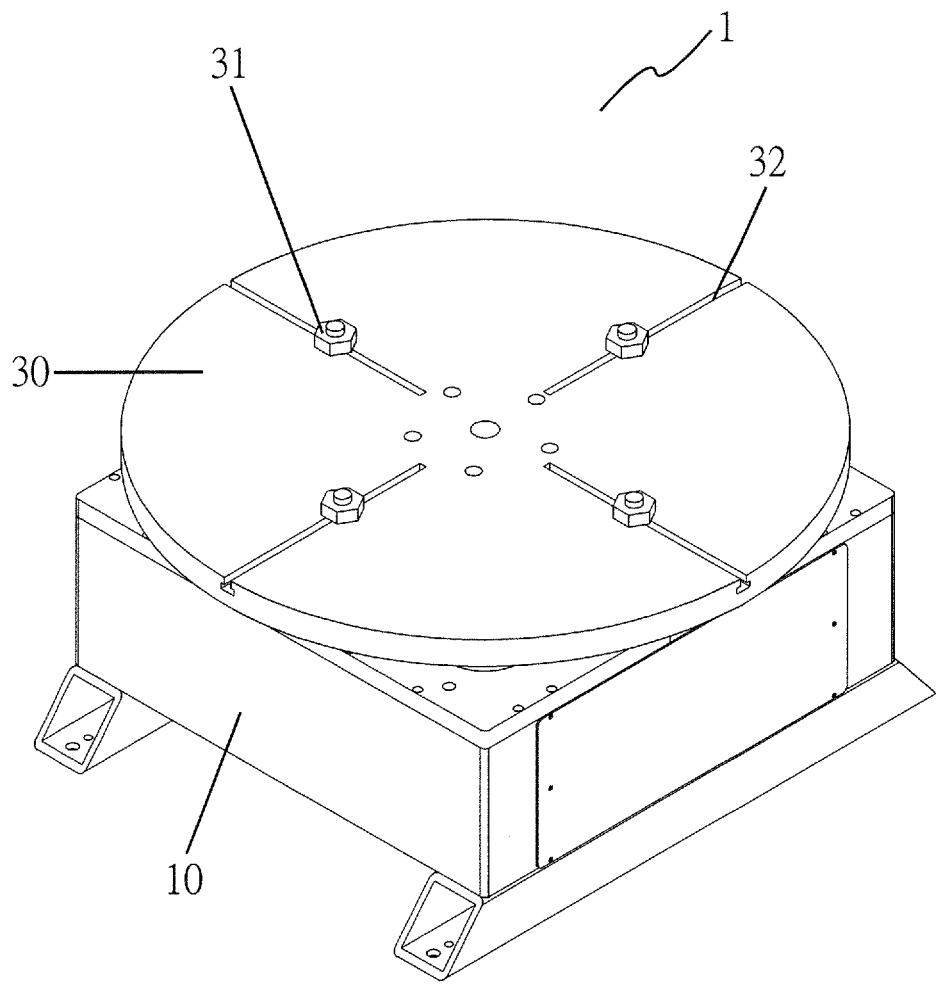
FIG. 1 is a perspective view showing a servo rotary carrier according to the present invention.
Figure 2:
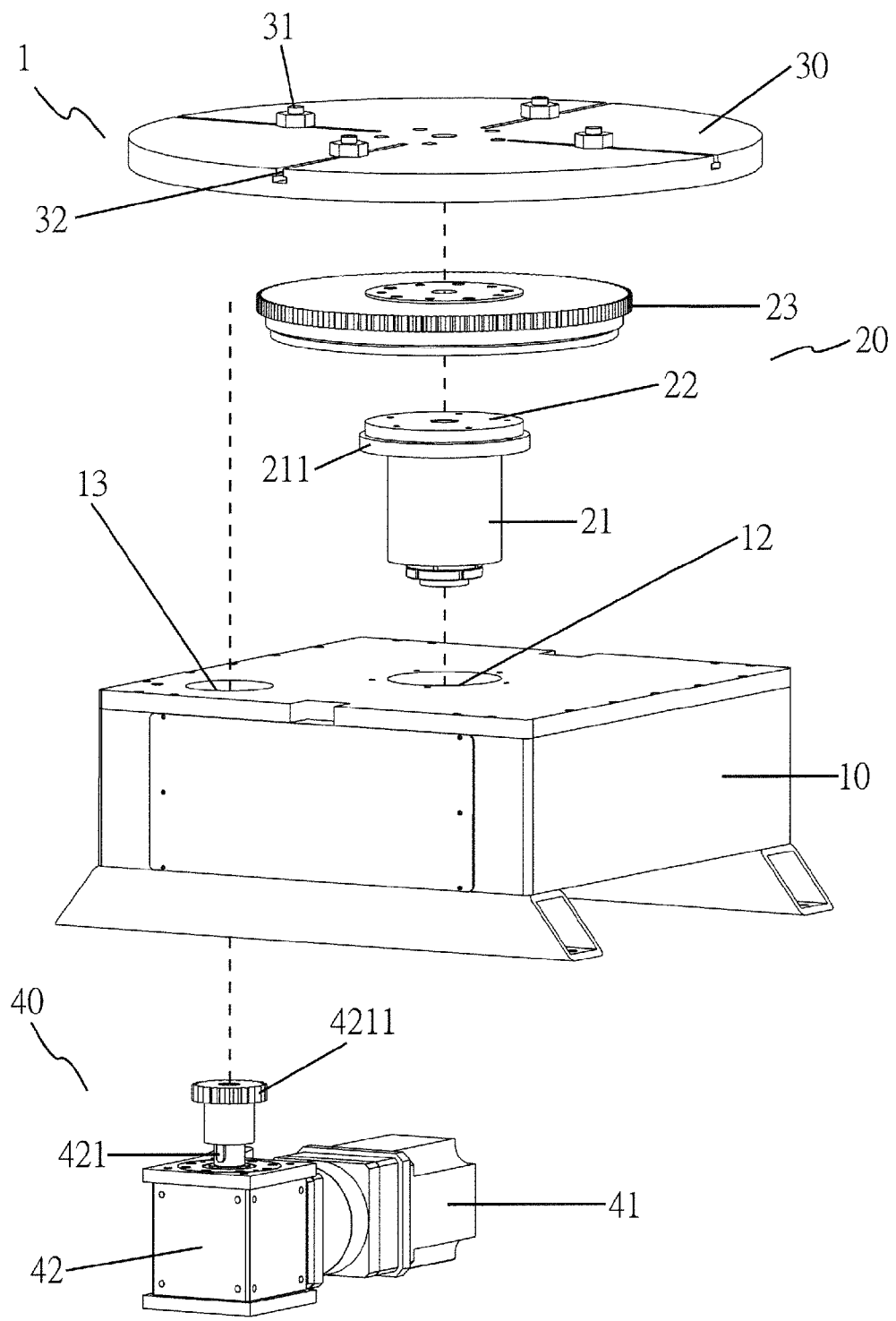
FIG. 2 is an exploded view of the servo rotary carrier according to the present invention.
Figure 3:
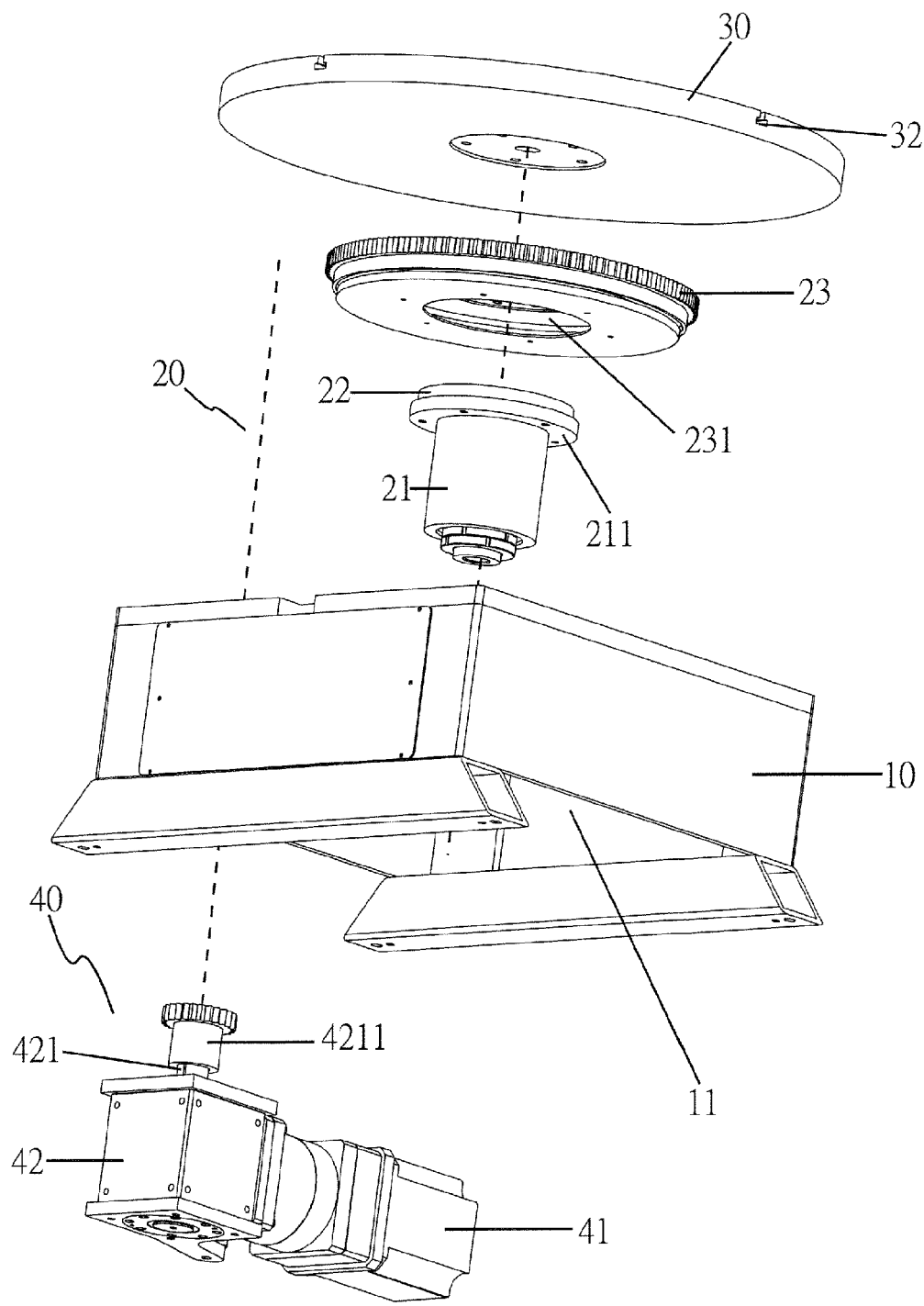
FIG. 3 is another exploded view of FIG. 2 taken at a different perspective.

Firstly, referring to FIGS. 1-3, a servo rotary carrier 1 according to the present invention comprises: a base 10, a rotation unit 20, a disk 30, and a power transmission unit 40.

Referring to FIGS. 2 and 3, the base 10 comprises a receiving space 11 formed therein. The base 10 has a top in which a first opening 12 that communicates with and between the receiving space 11 and the outside and a second opening 13 that communicates with and between the receiving space 11 and the outside are formed. The first opening 12 is arranged at a center of the base 10, while the second opening 13 is formed at a predetermined location in the base 10.

Referring to FIGS. 2 and 3, the rotation unit 20 comprises a supporting section 21 and a bearing 22 coupled to the supporting section 21. The supporting section 21 extends through the first opening 12 of the base 10. The bearing 22 has a top to which a first toothed wheel 23 is mounted.

The first toothed wheel 23 comprises a cavity 231 formed in a central portion thereof to receive the bearing 22 to fit therein. The supporting section 21 is also provided with a circumferentially extending flange 211 and the flange 211 is set in engagement with an undersurface of the first toothed wheel 23.

The disk 30 is arranged in such a way that the disk 30 has a top to which a plurality of clamping elements 31 is mounted. The first toothed wheel 23 is coupled to a bottom of the disk 30.

The disk 30 has a top in which a plurality of slots 32 is formed and the clamping elements are respectively and movably received in the slots 32.

The power transmission unit 40 comprises a power source 41 and a transmission device 42 coupled to the power source 41. The transmission device 42 has a transmission spindle 421 that extends vertically upward through the second opening

13. The transmission spindle 421 comprises a second toothed wheel 4211 coupled thereto to mate the first toothed wheel 23.

The power transmission unit 40 is arranged in the receiving space 11 of the base 10.

Figure 4:
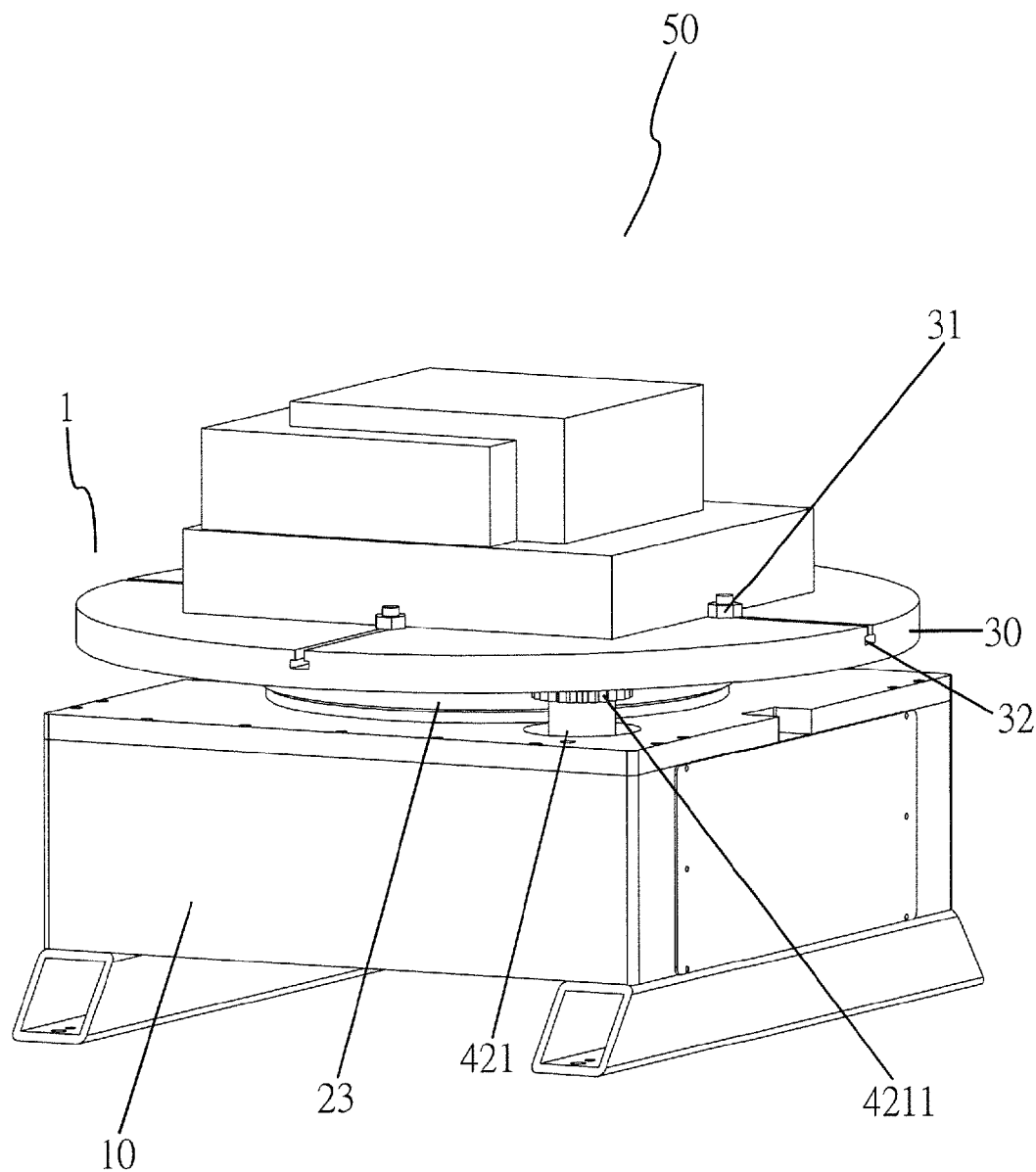
FIG. 4 is a perspective view showing an operating condition of the servo rotary carrier according to the present invention.

Referring to FIG. 4, to use, at least one object-to-be-inspected 50 is placed on the top of the disk 30 and the clamping elements 31 are used to clamp and fix the object-to-be-inspected 50. The power transmission unit 40 is activated so that the power source 41 drives the transmission device 42 to operate and the second toothed wheel drives the first toothed wheel to rotate the disk 30. Since the disk 30 is supported and carried by the rotation unit 20, improvement can be made to overcome the drawback of the conventional device where a motor is used to serve both a power source and a supporting structure, which results in insufficiency of supporting force, and also to enhance the life span.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A servo rotary carrier, comprising:
   a base, which comprises a receiving space formed therein, the base having a top in which a first opening that communicates with and between the receiving space and the outside and a second opening that communicates with and between the receiving space and the outside are formed, the first opening being formed in a center of the base, the second opening being formed at a predetermined location in the base;
   a rotation unit, which comprises a supporting section and a bearing coupled to the supporting section, the supporting section extending through the first opening of the base;
   a first toothed wheel having a central portion formed with a cavity to receive the bearing to fit therein, the supporting section of the rotation unit being provided with a circumferentially extending flange set in fixed engagement with an undersurface of the first toothed wheel;
   a disk, which is arranged in such a way that the disk has a top to which a plurality of clamping elements is mounted, the first toothed wheel being coupled to a bottom of the disk; and
   a power transmission unit, which comprises a power source and a transmission device coupled to the power source, the transmission device having a transmission spindle that extends vertically upward through the second opening, the transmission spindle comprising a second toothed wheel coupled thereto to mate the first toothed wheel.

2. The servo rotary carrier according to claim 1, wherein the power transmission unit is arranged in the receiving space of the base.

3. The servo rotary carrier according to claim 1, wherein the disk has a top in which a plurality of slots is formed and the clamping elements are respectively and movably received in the slots.

* * * * *